United States Patent [19]
Elliott et al.

[11] Patent Number: 5,781,147
[45] Date of Patent: Jul. 14, 1998

[54] FOG PIERCING RANGING APPARATUS AND METHOD

[75] Inventors: Scott Elliott; Eric A. Miller, both of Englewood; Jeremy G. Dunne, Littleton, all of Colo.

[73] Assignee: Laser Technology, Inc., Englewood, Colo.

[21] Appl. No.: 853,609

[22] Filed: May 9, 1997

Related U.S. Application Data

[63] Continuation-in-part of Ser. No. 788,426, Jan. 28, 1997, abandoned.

[51] Int. Cl.$^6$ .................................................. G01S 13/86
[52] U.S. Cl. .......................... 342/54; 342/23; 342/94; 342/95
[58] Field of Search .......................... 342/23, 54, 94, 342/95, 41

[56] References Cited

U.S. PATENT DOCUMENTS

| | | | |
|---|---|---|---|
| 3,690,767 | 9/1972 | Missio et al. | 342/23 X |
| 4,063,240 | 12/1977 | Isbister et al. | 342/23 X |
| 5,359,404 | 10/1994 | Dunne | 356/5 |
| 5,432,515 | 7/1995 | O'Conner | 342/23 |
| 5,521,696 | 5/1996 | Dunne | 356/5.07 |

FOREIGN PATENT DOCUMENTS

| | | | |
|---|---|---|---|
| 404013987A | 1/1992 | Japan | 342/23 |
| 1285697 | 8/1972 | United Kingdom | 342/23 |

OTHER PUBLICATIONS

Levy, J.F., "Data Acquisition System for the Docking of Large Ships", Conference:Int'l Conf. on Advances in Marine Navigational Aids, London, England, pp. 270–273, Jul. 1997.

*Primary Examiner*—John B. Sotomayor
*Attorney, Agent, or Firm*—William J. Kubida; John R. Wahl; Holland & Hart LLP

[57] ABSTRACT

An apparatus and method for accurately determining a target distance in adverse weather conditions utilizing both LASER and RADAR is disclosed. The radar signals are used to determine an approximate range which is then used as a gating window for the determination of which laser reflection is from the actual target as opposed to a reflection from the atmospheric interference. The method basically comprises the steps of initiating a radar pulse in the direction of a target and receiving a reflection, transmitting a laser signal and receiving a plurality of reflections, determining an approximate range based on the radar signals, and using this approximate range to ascertain which of the laser reflections is from the target. This determination is preferably made by generating a gating signal and gate width from the radar signals and passing the set of laser range signals through the gate to eliminate the false signals and select the signal that survives the gate as the accurate target range.

20 Claims, 4 Drawing Sheets

5,781,147

FOG PIERCING RANGING APPARATUS AND METHOD

CROSS REFERENCE TO RELATED APPLICATIONS

This application is a continuation-in-part application of U.S. patent application Ser. No. 08/788,426, filed Jan. 28, 1997, now abandoned, and is also related to U.S. Pat. Nos. 5,359,404 and 5,521,696, all of which are assigned to the assignee of the present invention.

BACKGROUND OF THE INVENTION

1. Field of the Invention

This invention relates generally to remote range finding apparatuses and methods and more particularly to an apparatus and method for accurate ranging in adverse weather conditions.

2. Description of the Related Art

Radar range finding instruments such as military and domestic aircraft monitoring installations and maritime vessel tracking and docking assistance systems typically do not have major problems seeing through atmospheric weather patterns. However, these same instruments do not have high accuracy or resolution such as accuracy to within a meter of the target object.

Laser range finding instruments, also known as LIDAR instruments (light distancing and ranging), on the other hand, are highly accurate but the light pulse can be reflected and distorted by adverse weather conditions such as fog, rain and snow. Consequently, laser range finding instruments are not normally used in adverse weather conditions.

Accordingly, both radar systems and laser systems have been used independently and together to monitor maritime vessel docking operations. One such system is marketed by Laser Communications Incorporated, a subsidiary of Laser Technology, Inc., 7070 S. Tucson Way, Englewood, Colo., the assignee of the present invention. This conventional system utilizes a laser range finder backed up by a radar range finder, both mounted on the vessel dock and aimed in the direction of vessel approach. Both the laser range finder and the radar systems are operated simultaneously, typically with the radar system providing a backup reference which is subservient to the laser system and thus not actively utilized. Its output data is recorded and stored for later comparison with the laser system results if needed. The radar system is not used for actual docking unless there is a problem with the laser system or substantial fog blocks the laser light pulses. In this latter instance, the laser system cannot distinguish a target vessel from the fog reflections and thus the only reliable indication of distance and vessel approach speed is provided by the radar system. A mobile vessel docking aid system incorporating both laser and radar systems is disclosed in copending U.S. application Ser. No. 08/788,426, Jan. 28, 1997, hereby incorporated by reference in its entirety.

During adverse weather conditions such as rain and fog, the accuracy of the conventional vessel docking aid systems is reduced because the laser ranging information is not usable and the less accurate radar ranging data must be used to provide distance and approach speed information. This accuracy is highly desirable to prevent excessive approach speeds of extremely large vessels. Accordingly, there is a need for a more accurate means of obtaining this information.

SUMMARY OF THE INVENTION

It is therefore an object of the present invention to provide a laser based ranging system for vessel range finding that can accurately determine distance to a target through fog and other atmospheric interferences by laser signals.

It is another object of the present invention to provide a laser based ranging system which utilizes a radar range signal to establish a gate window through which only a selected set of reflected laser signals can pass in order to distinguish a target from reflected laser signals that are reflected from interfering atmospheric conditions.

The apparatus in accordance with the present invention is a radar range and speed determining apparatus and a laser range and speed determining apparatus that work in concert, each feeding range information to the other to continuously narrow the detected target range determined by each instrument. A preferred embodiment in which the method in accordance with the invention is implemented is a vessel docking assistance system which utilizes two sets of identical laser and radar transceivers connected to a computer for signal processing, data storage, and display of vessel approach speed and distance.

This preferred embodiment essentially utilizes the less accurate range information determined from the radar transceiver data as a gating window for the analysis of the laser transceiver data to discriminate against false reflections from the atmosphere. The distance data determined from the laser is then utilized to generate a gating window for analysis of the radar transceiver data to further narrow the accuracy of the resultant distance and speed determinations.

These and other objects, features and advantages of the present invention will become more apparent from a reading of the following detailed description when taken in conjunction with the accompanying claims.

DETAILED DESCRIPTION OF THE INVENTION

Figure 1:
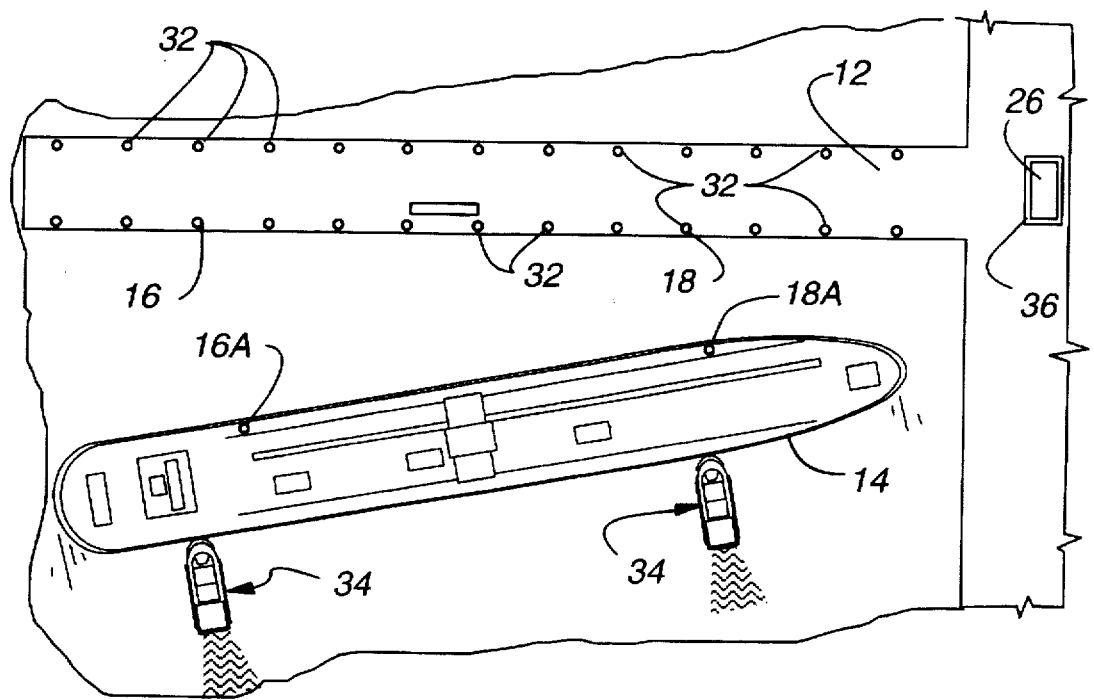
FIG. 1 is a schematic plan view of a vessel approaching a dock having a fog piercing docking aid apparatus in accordance with the present invention installed on the dock.
Figure 2:
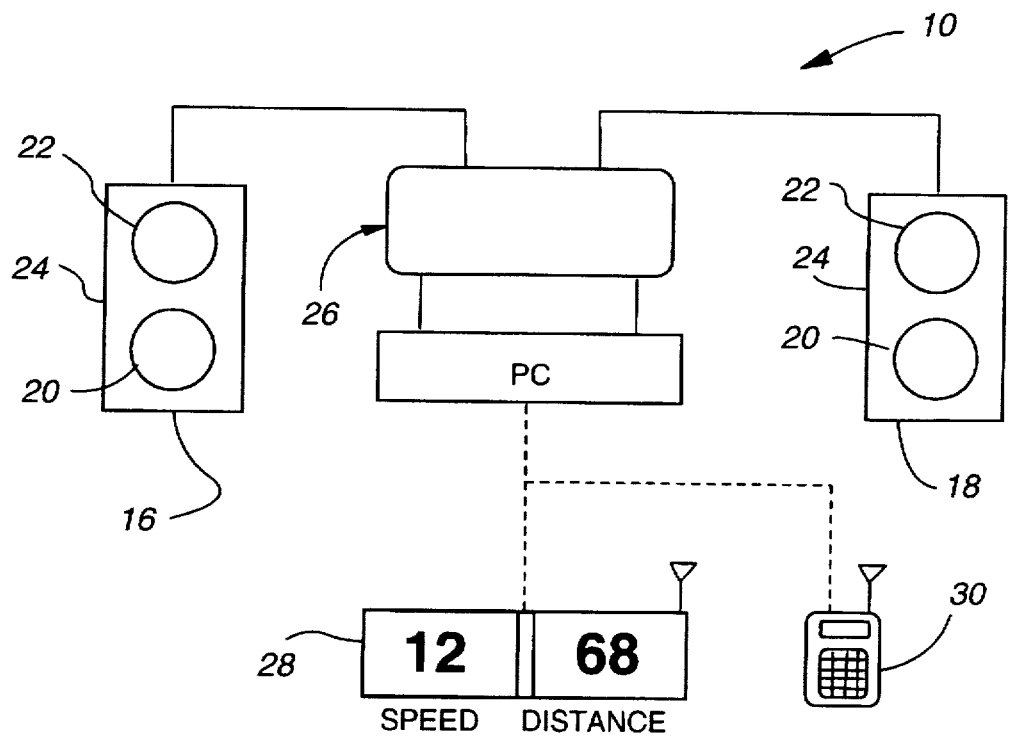
FIG. 2 is a block diagram of the fog piercing vessel docking aid apparatus of the present invention.

A first embodiment 10 of a fog piercing laser apparatus utilized as a vessel docking aid system in accordance with the present invention is shown in a plan view on a dock 12 in FIG. 1 to guide docking of a vessel 14. The docking aid system 10 of the present invention, shown in a block diagram in FIG. 2, provides shipboard and dockside personnel with approach speed and distance information as the vessel 14 nears the side of the dock. The system 10 includes a first sensor unit 16 mounted at one of a predetermined set of locations 32 on the dock 12 and second sensor unit 18 spaced from the first unit 16 at another location 12. Alternatively, the sensor units may be mounted fore and aft on board the vessel 14 as shown by units 16A and 18A in FIG. 1.

Each sensor unit 16 and 18 includes a laser transceiver 20 and a radar transceiver 22 mounted in a common NEMA rated weatherproof housing 24. The output of each of the transceivers 20 and 22 is transmitted to a computer 26 for data processing, data storage, communication and display. The computer 26 may be separately located as shown in FIG. 1 at a remote location such as a control tower/room for the entire docking facility or optionally be enclosed within the housing 24, or alternatively in a separate enclosure on the dock or the vessel 14. In the remote location configurations, the sensed laser reflections and radar reflections may be transmitted via modem, hard wire, or via radio signal to the computer 26.

Figure 6:
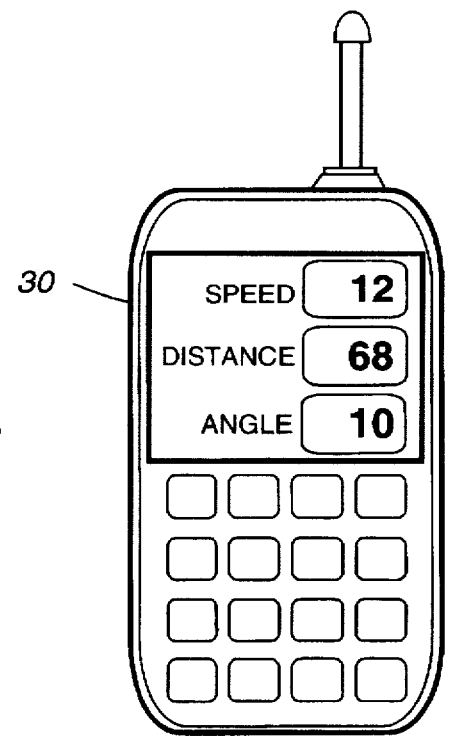
FIG. 6 is a plan view of a hand held portable display receiver utilized with the preferred embodiment of the present invention.

The computer 26 may also transmit a video display to a dock mounted receiver and display device 28 and/or to one or more hand held receiver/display devices 30, such as is shown in FIG. 6, which can be carried and viewed by dock workers and the harbor pilot located on the vessel. This alternative is especially desirable during low visibility conditions.

The computer 26 processes the incoming reflected laser and radar data signals, comparing them to the transmitted radar and laser pulses, and converting the received data signals to electrical analog and/or digital signals representative of the approach speed and distance of the vessel 14 as seen from the location of each sensor 16 and 18. The computer 20 may be a general purpose device such as a PC (personal computer or server) with an appropriate interface card to provide appropriate signal conversion and control functions. In addition, the computer 20 may be coupled to a database for data storage and to a transmitter for sending a display signal to a remote location such as a receiver located on the vessel 14, on tug boats 34 maneuvering the vessel 14, or at a harbor traffic control center 36.

The fog piercing aspect of the present invention is implemented basically by utilizing the range to the target vessel data determined from the radar transceiver output by the computer 26 as a gate signal input to the laser gate window for processing the laser data from the laser transceiver 20. Thus the laser ranging circuitry is instructed by the radar, in effect, as to the approximate actual target range. The laser range determining circuitry then looks only within the window provided by the radar gating. The laser range determined in this manner is preferably also fed back to the radar range data processing portion of the computer to generate a narrowing range gate for processing the next set of radar signals. In this manner, increasingly accurate range and speed information is obtained from each sensor 16 and 18.

Figure 4:
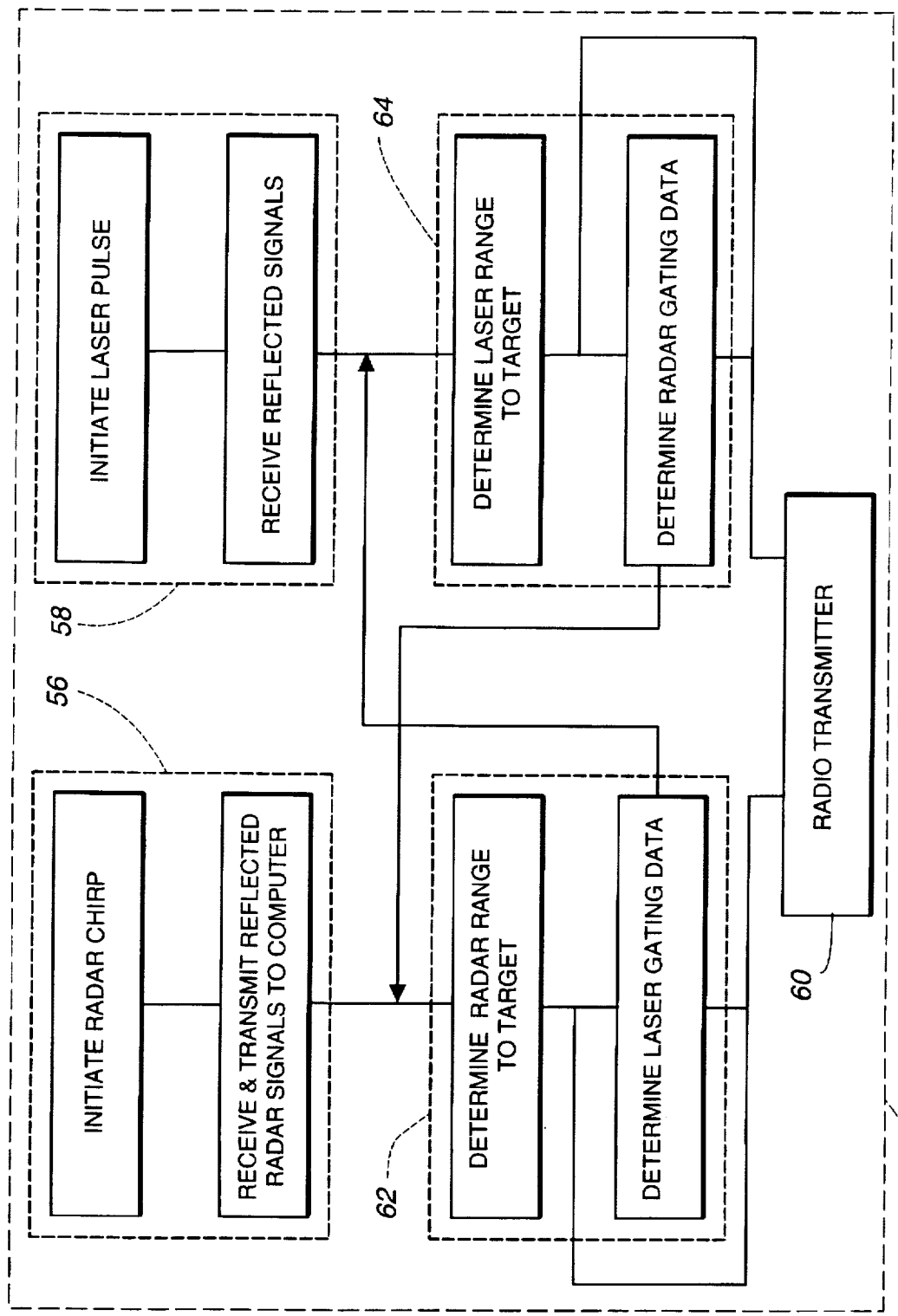
FIG. 4 is a schematic block diagram of an alternative preferred embodiment of the docking aid apparatus incorporating the present invention.

A flow chart of the process steps performed in accordance with the present invention are provided in FIG. 4. In operation 100, the radar transceiver 22 issues a radio frequency set of pulses or chirp. The radar transceiver 22 is a conventional Doppler radar transceiver housed with the laser transceiver in a NEMA housing 24. In the preferred vessel docking embodiment illustrated, the radar transceiver is a relatively short range unit having an X-band output of 75 mW and a K-band output of 15 mW.

The radar transceiver 22 then receives reflected frequencies from the target and other interfering objects and transmits this reflection data to the computer 26 for signal processing in operation 102. In operation 104 the computer 26 processes the reflection data in comparison to the transmitted chirps to determine an approximate radar target range. This approximate radar range, in the preferred embodiment illustrated herein, is typically on the order of 1 to 300 meters from the edge of the dock 12.

The computer 26 then converts the approximate radar target range in operation 106 into a gating window data signal which is then applied to the laser data processing operation 108 in which the laser data processing gates are set to the radar range plus or minus ½ the gate width. The laser sensor 16 is then pulsed in operation 110. Alternatively, this operation 110 may be performed in parallel with the radar chirp step in operation 100. Laser reflected light signals are sensed by the transceiver 20 and transmitted to the computer 26 in operation 112.

The computer 26 then compares the received return laser signals to the gate window determined in operation 108 and selects only those signals passing through the gate window in operation 114. The computer 26 then determines a laser range from the selected signals in operation 116. The computer 26 then transmits and/or displays the laser range in operation 118. The computer 26, in operation 120, optionally converts the laser range to a radar gate signal and feeds this radar gate signal back to operation 104 in order to more narrowly determine the target range. The operation 120 is optional and may be omitted at the discretion of the system operator.

The resultant radar range and laser range information is then fed to the speed determining operation 122. Target approach speed is determined by comparing sequential range signals to timing clock intervals in a conventional manner.

The operation of the radar and the laser transceivers 20 and 22 in operations 100 and 102 and 110 and 112 may be done simultaneously and the data stored in computer memory to await signal analysis. In this way the computer 26 can continuously provide updated gating signals to range determining operations 104 and 116. The result of this range feedback from the radar to the laser portion of the range determining apparatus results in an enhanced accuracy range and speed determinations as well as the capability of maintaining accuracy during adverse weather conditions. Even further improvements in accuracy may also be obtained by providing the laser range back to the radar signal processing portion in operation 120.

Figure 3:
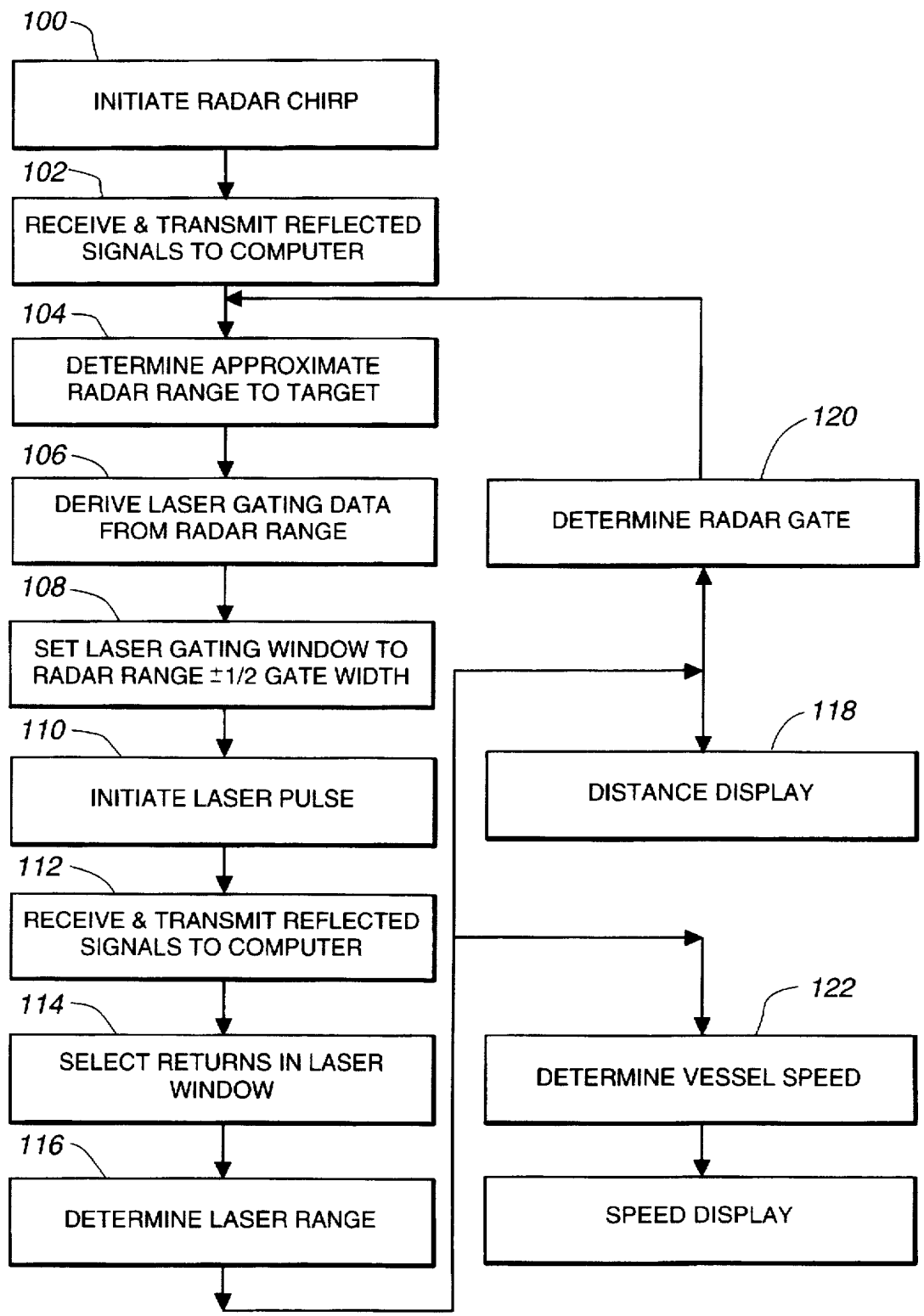
FIG. 3 is a process block diagram of the method in accordance with the present invention.
Figure 5:
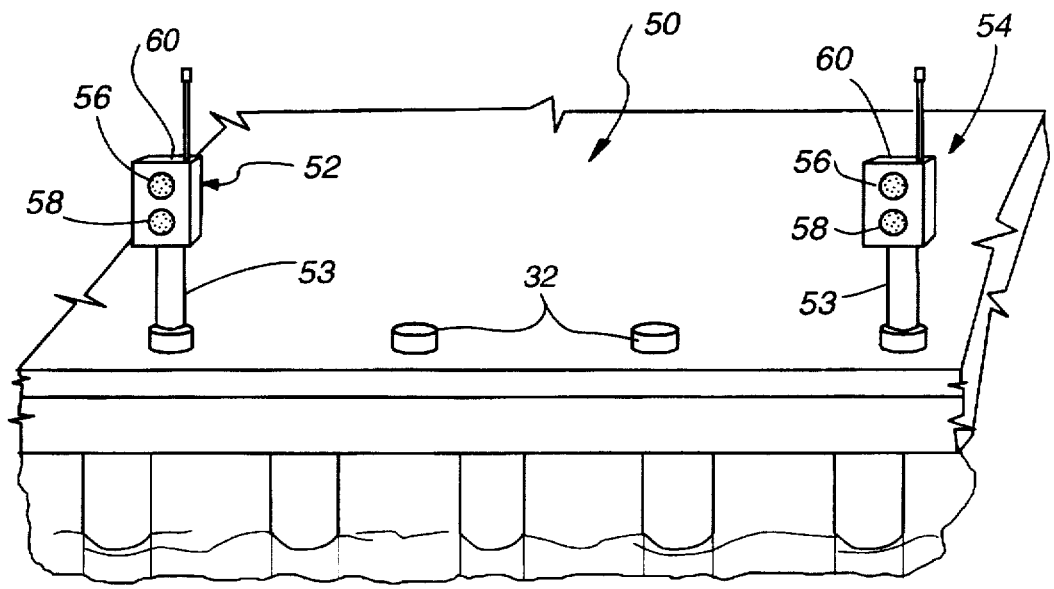
FIG. 5 is a perspective view of the alternative preferred embodiment of the invention.

FIGS. 4 and 5 shows an alternative embodiment 50 of a docking aid system in accordance with the present invention. The docking aid system 50 comprises a first transceiver unit 52 and a second transceiver unit 54 mounted in spaced relation on posts 53 at predetermined positions 32 along a dock edge 12 or alternatively on an approaching vessel 14. Each of the transceivers 52 and 54 includes a radar transceiver 56, a laser transceiver 58, and a radio signal transceiver 60 for communicating with a remote data logger or display device such as a PC 26 or a hand held unit 30. The first transceiver unit 52 and second unit 54 differs from the first embodiment in that each radar and laser transceiver 56 and 58 each includes a dedicated microprocessor 62 and 64 respectively for comparing transmitted and reflected signals and determining a range in each transceiver. Each transceiver determines a gating signal which is sent internally to the other transceiver unit within the same housing 24 for zeroing in on the most accurate range signal as is shown in FIG. 4. The radio transceiver 60 transmits either or both the laser range signal and the radar range signal to the remote location 36 and/or the hand held unit 30 for data storage and/or display. Operation of the gating is the same as described with reference to FIG. 3 above and is outlined in FIG. 4.

Since the transceivers 52,54 and 20,22 are located a predetermined distance apart, the approach angle between the vessel 14 and the dock 12 may be determined by the computer 26 or the internal microprocessors 62,64 and displayed along with distance and speed as is shown on the exemplary hand held display in FIG. 6.

While the invention has been described with reference to a preferred embodiment thereof, specifically a vessel docking aid system, it is to be understood that such description is by way of example and not by way of limitation. For example, the apparatus of the invention may be used in a combination radar/laser speed gun for motor vehicle traffic monitoring operations. Both the radar transceiver and the laser transceiver may be activated simultaneously or sequentially. The feedback between the laser to the radar and the radar to the laser to narrow the windows through which range signals pass may be limited in cycles by appropriate counters, or may be continuous in order to settle out at a maximum range accuracy and sensitivity. The apparatus and method according to the invention may be implemented in land based systems such as airport runway approach monitoring systems and motor vehicle monitoring operations. The computer 26 may be miniaturized and a single microcomputer utilized instead of one for the radar transceiver and one for the laser transceiver as shown in FIG. 4, and integrated into one of the housings 24 and the signals from the transceivers to the computer may be transmitted by radio, modem, hard wiring or other conventional means. In addition, the signal processing functions of the laser signals and the radar signals may be performed by separate circuitry within the transceivers rather than being processed by a separate computer. In this instance, the feedback signals between the radar transceiver and the laser transceiver would be converted to gating parameters within each transceiver. Other applications, changes, modifications, and variations will be readily apparent to those skilled in the art. Accordingly, all such modifications and variations are intended to be encompassed by the present invention as defined by the appended claims. All patents, patent applications, and printed publications referred to herein are hereby incorporated by reference in their entirety.

What is claimed is:

1. An apparatus for range finding comprising:
    a radar transceiver adapted to send a radio frequency signal toward said target and receive at least one reflected signal from said target and produce radar data representative of said transmitted and reflected radar signals;
    a laser transceiver adapted to transmit a laser light signal toward an expected target, receive at least one reflected laser light signal and produce laser data representative of said transmitted and reflected laser signals; and
    a computer coupled to said laser transceiver and to said radar transceiver receiving said radar data and said laser range data, wherein said computer determines an approximate range from said radar data and utilizes said approximate range to provide a laser gating window to determine a laser range from said laser data.

2. The apparatus according to claim 1 wherein said computer determines a radar range gating window from said laser range and determines an accurate radar range utilizing said radar range gating window and said radar data.

3. The apparatus according to claim 1 further comprising a display device coupled to said computer for providing a display of said laser range or said radar range.

4. The apparatus according to claim 3 wherein said computer determines speed from successive determinations of laser range from sequentially received sets of laser range data.

5. An apparatus for range finding comprising:
    a radar transceiver adapted to send a radio frequency signal toward said target and receive at least one reflected signal from said target and produce radar data representative of said transmitted and reflected radar signals;
    a radar computer coupled to said radar transceiver having a processor determining a radar range from said radar data and computing a laser gating signal;
    a laser transceiver adapted to transmit a laser light signal toward an expected target, receive at least one reflected laser light signal and produce laser data representative of said transmitted and reflected laser signals; and
    a laser computer coupled to said laser transceiver receiving said laser data and said laser gating signal, wherein said laser computer determines a laser range from said laser data and said laser gating signal.

6. The apparatus according to claim 5 further comprising said laser computer determining a radar gating signal from said laser range and coupling said radar gating signal to said radar computer to refine said radar range.

7. The apparatus according to claim 6 further comprising a display device coupled to one of said computers for displaying either said radar range or said laser range.

8. A method for laser range finding during inclement weather conditions utilizing a radar transceiver and a laser transceiver comprising the steps of:
    issuing a radar chirp from said radar transceiver in the direction of an anticipated target;
    receiving a plurality of reflected radar signals;
    issuing a laser light pulse from said laser transceiver in the direction of said anticipated target;
    receiving a plurality of reflected laser light signals;
    selecting one of said plurality of reflected radar signals as a target reflection;
    determining a radar range from said target reflection and said radar chirp;
    determining a laser gating signal from said radar range;
    setting a laser gating window to said laser gating signal plus a gate width;
    applying said window to said reflected laser signals to determine a selected laser signal that passes through said window;
    converting said selected laser signal to a laser range; and
    displaying said laser range.

9. The method according to claim 8 further comprising the steps of:
    determining a radar gating signal from said laser range; and
    applying said radar gating signal to said radar reflections to determine said radar target reflection.

10. The method according to claim 8 wherein said steps of selecting, determining, setting, applying and converting are performed by a computer coupled to said radar transceiver and said laser transceiver.

11. The method according to claim 8 wherein said steps of selecting and determining are performed by a computer in said radar transceiver.

12. The method according to claim 8 wherein said steps of setting, applying and converting are performed by a computer in said laser transceiver.

13. The method according to claim 10 wherein said transceivers are housed in a single enclosure with said computer.

14. A method of determining an accurate range to a target during adverse weather conditions comprising the steps of:

sending a first radar signal from a radar transceiver toward said expected location of said target;

receiving a first set of reflected radar signals from said target;

determining from said transmitted and reflected radar signals an approximate range to said target;

sending a laser signal from a laser transceiver toward an expected location of a target;

receiving a first set of reflected laser signals in said laser transceiver;

determining from said transmitted laser signal and said first set of reflected laser signals a set of potential target ranges; and selecting from said set of potential target ranges a range closest to said approximate range to said target as said accurate range.

15. The method according to claim 14 wherein said step of determining from said transmitted and reflected radar signals includes setting a laser gating window equal to a value equivalent to said approximate range.

16. The method according to claim 15 wherein said step of determining from said transmitted laser signal and said first set of reflected laser signals includes comparing said set of reflected laser signals to said laser gating window and said step of selecting includes selecting a laser signal.

17. The method according to claim 15 wherein said selected one of said potential target ranges is provided to said radar transceiver as a gate to improve accuracy of said approximate range determined by said radar transceiver.

18. A vessel docking aid system for providing approach speed and range information to operating personnel comprising:

a first sensor unit having a radar transceiver and a laser transceiver therein, mounted on one of said dock or said vessel;

a second sensor unit having a second radar transceiver and a second laser transceiver therein; and at least one computer coupled to said sensor units for analyzing data transmitted from said first and second transceivers, said computer receiving reflection signals from both said radar and laser transceivers and determining radar target ranges and a laser target ranges therefrom, said computer utilizing said determined radar target range to select one of said laser ranges as an accurate laser target range.

19. The system according to claim 18 wherein said computer converts said radar range to a laser gating window for determining said laser range to said target.

20. The system according to claim 19 wherein said computer utilizes said laser range to generate a radar gate for determining said radar target range.

* * * * *